Patented Nov. 4, 1947

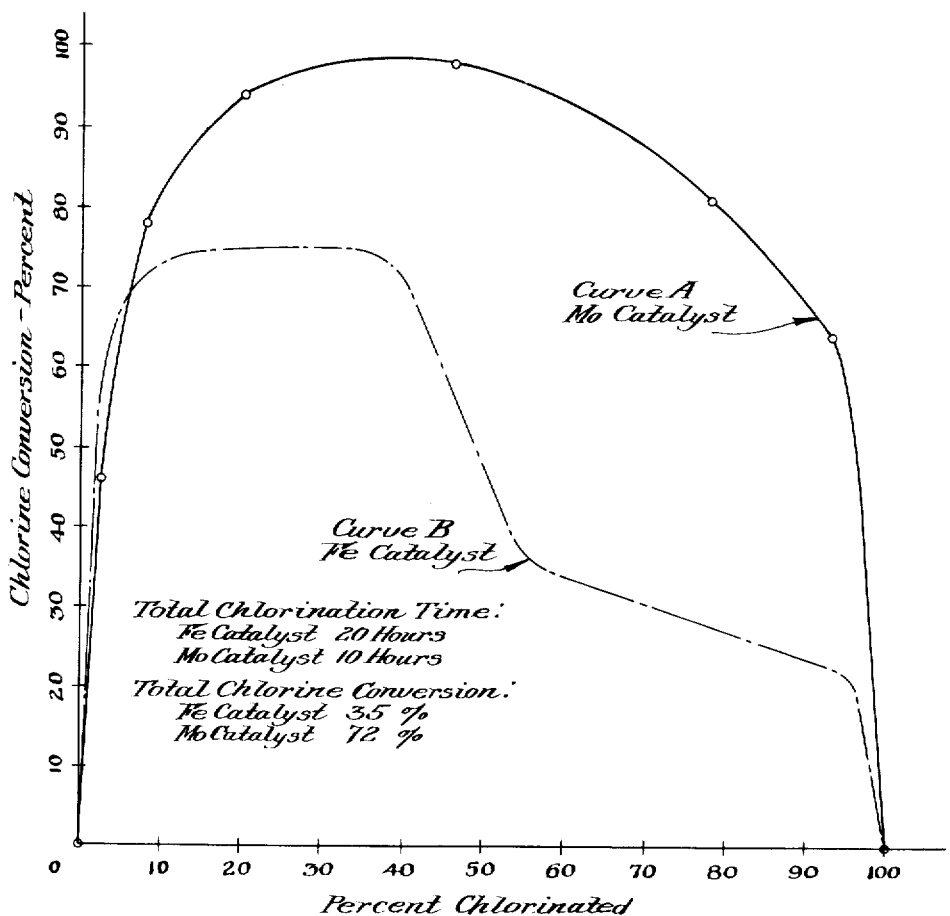

2,429,985

UNITED STATES PATENT OFFICE 2,429,985

CHLORINATION OF PHTHALIC ANHYDRIDE

Paul W. Blume, Gerald A. Thomas, and Gervais Baillio, Niagara Falls, N. Y., assignors to Niagara Alkali Company, Niagara Falls, N. Y.

Application February 22, 1944, Serial No. 523,474

7 Claims. (Cl. 260—341)

This invention relates to a process for the chlorination of phthalic anhydride.

Many metallic chlorides as well as some non-metallic chlorides have been recognized as effective chlorine carriers or catalysts for the direct chlorination of organic compounds. Among these may be included the chlorides of iron, aluminum, antimony, vanadium, zirconium, beryllium, titanium, molybdenum, tin, uranium, gold thallium, cerium, tellurium, thorium, bismuth manganese, zinc, copper, sulfur, arsenic, phosporus boron bromine, and iodine.

Most of these catalysts are known to be effective in the substitution chlorination of benzene and other aromatic hydrocarbons. Because of high activity and commercial availability at comparatively low prices the chlorides of iron, aluminum, and antimony have been widely used in commercial processes for the substitution chlorination of aromatic hydrocarbons and in some cases their derivatives. However, chlorides of tin, vanadium, molybdenum, titanium, zirconium, tellurium, bismuth, iodine and other chlorides are also recognized as effective catalysts in these reactions. Aronheim, Berichte 8:1400 (1875) chlorinated benzene to dichlorobenzene using molybdenum pentachloride as a catalyst. In the chemical literature it is common to find statements, such as that in Ellis, Chemistry of Petroleum Derivatives, I, 755, that "the usual halogen carriers promote nuclear substitution. Many halogen carriers such as iodine, iron or aluminum halides exert such a powerful influence not only on the rate of nuclear substitution but also on the type of substitution that all other factors are completely nullified." In the chlorination of benzene with ferric chloride as a catalyst even at low temperatures such as 40° C. the chlorine may be introduced extremely rapidly, and it is the removal of the heat of chlorination and the problem of contacting the chlorine with the reaction mass which limits the commercial chlorination rate more than the lack of activity of the catalyst. This illustrates the effectiveness of the usual chlorination catalysts in accelerating the chlorination of aromatic hydrocarbons.

While an academic consideration of the problem might make it seem a simple matter to find a useful catalyst for the chlorination of phthalic anhydride and while the solution to the problem might be considered to be an obvious selection from among a number of known and useful catalysts, such is not the case. The chlorination of phthalic anhydride is extremely difficult and is by no means as simple as the chlorination of benzene and other aromatic hydrocarbons to which the literature on aromatic chlorination usually refers. Its chemical and physical nature are such that chlorination with most of the usual catalysts is impossible or impractical.

Phthalic anhydride is a very unreactive compound with respect to oxidation and chlorination and even sulfonates with some difficulty. Because of this lack of reactivity almost all of the usual chlorination catalysts are ineffective or are so slightly effective that they are not satisfactory for use in a commercial process. The introduction of the last two chlorine atoms into the phthalic anhydride is particularly difficult to catalyze by catalysts of the prior art. For this reason most prior art processes employed indirect methods, such as sulfonation (German Patent 50,177 and United States Patent 1,997,226) or nitration (British Patent 357,165) followed by chlorination. These methods are much less desirable than simple direct chlorination because of the cost of the acid, the cost of handling and disposing of the acid wastes, the risk of side reactions, and the contamination or reaction of the HCl so that this by-product cannot be sold.

It has been proposed to employ antimony pentachloride (United States Patent 322,368) in the chlorination of phthalic anhydride. The anhydride is chlorinated first with a large quantity of antimony pentachloride (6 parts of $SbCl_5$ to 1 part phthalic anhydride). Later chlorine is introduced to regenerate the $SbCl_3$ and to complete the chlorination. This process is undesirable because of the large quantity of $SbCl_5$ required. In this case the $SbCl_5$ acts more as a reactant than as a catalyst. In the usual direct catalytic chlorination, for example of benzene, the chlorine carrier is present only in catalytic amounts, that is in an amount much less than the stoichiometric quantity required for the reaction. When employed in catalytic amounts $SbCl_5$ is not an effective chlorine carrier because the chlorine conversion is low and the reaction time is unduly long.

Ferric chloride has also been proposed as a catalyst in the chlorination of phthalic anhydride (United States Patent 2,028,383) and it is true that catalytic amounts of $FeCl_3$ will catalyze this reaction and it is even possible to employ this catalyst in a commercial process. However, as pointed out in the example in the above patent, the chlorination is quite slow and about 72 hours are required to complete the chlorination to tetrachlorophthalic anhydride. This time may be reduced by passing in chlorine at a more rapid rate but only at the expense of low chlorine conversions. Ferric chloride may be considered a mediocre catalyst for this chlorination.

Other known aromatic chlorine carriers, such as aluminum, tin, zinc, titanium, zirconium, vanadium, bismuth, tellurium and iodine chlorides are completely ineffective as catalysts for the chlorination of phthalic anhydride to produce chlorophthalic anhydrides. Aluminum chloride is inactive at 165° C. and at 200° C. or higher side reactions take place with the formation of a resinous material entirely unlike the crystalline tetrachlorophthalic anhydride. A few of the known catalysts, such as tungsten chlorides, may show some catalytic effect but the conversions are very low and they are not practicable for commercial chlorinations.

One of the objects of this invention is to provide an improved method of chlorinating phthalic anhydride. Another object is to provide an improved method by means of which phthalic anhydride may be chlorinated by elemental chlorine at high rates and at high conversion. Other objects and advantages of this invention will appear from the following description and claims.

We have discovered that molybdenum chlorides have a very powerful catalytic effect in the chlorination of phthalic anhydride or its chloro derivatives and that they maintain this catalytic effect to the end of the reaction without promoting unwanted reactions or without the need for unduly high temperatures. This discovery is particularly surprising since other direct chlorination catalysts are entirely ineffective in this reaction or at the best are poor or mediocre catalysts. So far as we are aware molybdenum is unique in its catalytic activity in this reaction and there is no other catalyst which will promote the simple direct chlorination of molten phthalic anhydride to tetrachlorophthalic anhydride at high rates and high conversions.

The process of our invention is essentially quite simple. Chlorine is passed through a diffuser plate at the bottom of a reactor containing molten phthalic anhydride at about 200° C. The temperature is controlled by heating or cooling as required. At the preferred high chlorination rates the heat of chlorination is sufficient to maintain the desired temperature and cooling may be required. As the reaction proceeds and there is little of the volatile phthalic anhydride left the temperature may desirably be increased gradually to the final temperature which will usually be slightly higher than the melting point of tetrachlorophthalic anhydride which is 255 to 256° C. Final temperatures of 260 to 275° C. are suitable and the reaction may be completed in nine to twelve hours.

While we have described the chlorination of phthalic anhydride in the molten state at temperatures of 200° C. and higher, it is possible to operate at lower temperatures during that part of the chlorination when the melting temperature of the reaction mass is low. The minimum melting temperature of the batch is about 55° C. but the catalyst is not very active at such low temperatures and it is usually preferable to operate above 150° C. The reaction mass may be maintained in the liquid state also by the use of an added inert solvent or other inert material to depress the melting point of the reaction mass, particularly near the end of the reaction. In the broad form of our invention, we do not wish to be limited to operation above the normal melting temperature of the reaction products, since any temperature at which a satisfactory catalytic reaction takes place may be employed.

We have described the use of our process to make tetrachlorophthalic anhydride but it will be apparent that it is also suitable for making the lower chlorinated derivatives, such as mono-, di-, and trichlorophthalic anhydride or various mixtures containing the lower chlorinated derivatives, with or without tetrachlorophthalic anhydride.

While we have described the use of a single chlorinator, it will usually be preferable to employ two or more chlorinators in series in order to react any excess chlorine in the HCl gas which is formed during the chlorination, to scrub out any volatilized molybdenum chlorides and phthalic anhydrides, and to permit the use of a gas cooler which operates at a relatively low temperature and yet will not plug up with the high melting tetrachlorophthalic anhydride which becomes volatilized during the process. The materials from the second chlorinator will usually be a low melting mixture of phthalic anhydride and chlorophthalic anhydrides and may be charged to the first chlorinator for further chlorination.

The crude reaction may if desired be purified in any known manner.

We have discovered that most of the molybdenum catalyst is readily removed from the reaction mass after the chlorination by passing a stream of chlorine or inert gas through the mass at the reaction temperature for a short time. The catalyst and excess chlorine may be recovered in the later chlorinators of the series. This is a particular advantage of molybdenum as a catalyst since ferric chloride is not sufficiently volatile to be removed in this manner.

In the accompanying drawings:

Fig. 2 shows curves comparing our improved process with a process using iron as a catalyst.

Figure 1:
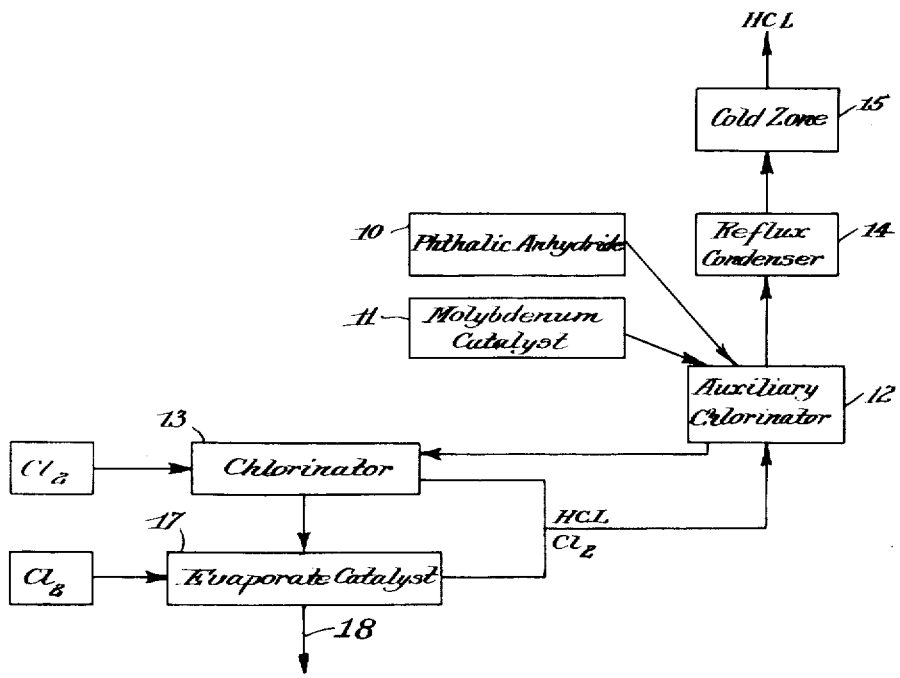
Fig. 1 is a flow diagram showing by way of example one particular embodiment of our invention.

The flow diagram of Fig. 1 outlines a process employing our molybdenum catalyst in a particularly economical and effective manner. In this flow diagram, 10 represents a supply of phthalic anhydride and 11 is a supply of molybdenum metal or its chloride. These materials in the desired proportions are fed to an auxiliary chlorinator 12 at the beginning of a batch. 13 is the main chlorinator containing a batch of partly chlorinated phthalic anhydrides which have been discharged from the auxiliary chlorinator 12. Chlorine gas is introduced into the main chlorinator 13 and reacts with the charge in this chlorinator, and the HCl and excess chlorine are discharged to the auxiliary chlorinator 12, where the excess chlorine is reacted with the phthalic anhydride and with molybdenum metal, if this is used as a catalyst. Since phthalic anhydride and its chlorinated compounds are volatile at the temperatures used in the main chlorinator, some of these materials are carried in the gas stream and are partly condensed in the auxiliary chlorinator.

The gases from the auxiliary chlorinator 12 pass into a reflux condenser 14 maintained at a temperature slightly above the melting point of the phthalic anhydride which has evaporated in the chlorinator 12 and is carried in the gas stream to the condenser 14. Most of this phthalic anhydride is condensed in the reflux condenser 14 and the remainder together with HCl passes to a cold zone 15, in which substantially the balance of the anhydride is condensed and the hydrochloric acid is discharged from the system.

17 represents the operation or step of evaporating the catalyst after the chlorination of the phthalic anhydride is substantially completed by passing extra chlorine, or any other gas which is inert to the hot reaction mass, through this mass. The chlorine or other gas containing the volatilized catalyst, is conducted to the chlorinator 12, where the catalyst and the chlorine are recovered and used in the chlorination of the batch in the chlorinator 12. This step may be omitted if it is not desired to recover the catalyst and if the extraction step is particularly effective, but it will usually be desirable to employ it.

The chlorinated batch from chlorinator 13 after operation 17 may be withdrawn as indicated at 18 and purified in any manner desired.

There are certain advantages of using a volatile catalyst like molybdenum chloride which is readily soluble in water and no catalyst of the prior art has these advantages. Most of the catalyst may be volatilized to the chlorinator 12 where it is recovered. The remainder of the catalyst is substantially removed by a simple extraction with hot water.

An additional feature of the preferred form of our invention is the employment of the additional chlorinator or chlorinators 12 followed by the reflux condenser 14 operating above the melting point of the condensing vapor and further followed by the cold surface 15 to condense organic material and catalyst from the HCl stream. If a condenser or cold zone follows immediately after the main chlorinator there is the danger that the high melting product will plug the outlet. Scrapers are difficult to design and operate and the high melting point makes alternate melting and cooling difficult and undesirable. In our preferred process, the highest melting product entering the reflux condenser and the cold zone is phthalic anhydride, since the higher melting point chlorinated anhydrides volatilized in the chlorinator 13 are condensed in the auxiliary chlorinator 12, and consequently, do not reach the reflux condenser. Consequently, any solidified material in the condenser or cold zone may be readily removed by melting with steam at ordinary pressures.

The advantages of our invention will be apparent from consideration of the following examples which illustrate the difference in effectiveness of molybdenum chlorides and the usual chlorination catalysts:

*Example I*

1.4 g. of molybdenum metal powder was added to 200 g. of molten phthalic anhydride in a 1 inch reaction tube with a fritted glass diffuser at the bottom. Chlorine gas was introduced through the frit at 50–60 g. per hour and the temperature was gradually raised from 200 to 270° C. The reaction was completed in ten hours as indicated by zero conversion of chlorine to HCl at the end of the reaction. The average chlorine conversion was 72%. The crude product with a melting point of 254° C. was purified and found to have a melting point of 255.4° C. and an acidity number equivalent to 100.0 percent tetrachlorophthalic anhydride was obtained.

*Example II*

4.14 g. FeCl₃ (equivalent to 1.4 g. Fe) was added to 200 g. of molten phthalic anhydride in the same reactor used in Example I. The chlorine rate was 50–60 g. per hour and the temperature was increased from 200 to 270° C. as in Example I. The reaction was completed in 20 hours as indicated by zero conversion of chlorine to HCl at the end of the reaction. The average chlorine conversion was 35%. After purification, the product had a melting point of 255.0° C. and an acidity number equivalent to 100.0 percent tetrachlorophthalic anhydride.

Figure 2 shows curves comparing the efficiency of Mo and Fe as catalysts in the chlorination of phthalic anhydride by the methods described in Examples I and II.

Curve A shows the course of the chlorination described in Example I using Mo as a catalyst. It will be observed that after the first hour (i. e. after the batch is 7 or 8 percent chlorinated), the molybdenum metal has been substantially chlorinated and a high conversion of chlorine is obtained with a peak at 98 percent conversion. A high conversion is maintained until the last 10 percent of the chlorination when dilution of the reaction mass with tetrachlorophthalic anhydride causes the conversion to fall. Curve B shows the course of the chlorination described in Example II using Fe as a catalyst. It will be observed that the maximum chlorine conversion is only 75 percent and that the conversion decreases rapidly when the batch is only about 40 percent chlorinated. The conversion during the last half of the chlorination is only about 20–35 percent. The entire chlorination required 20 hours with the Fe catalyst and only half as long, or 10 hours with the Mo catalyst. It will be obvious that Mo is a much superior catalyst and this superiority is especially marked during the last half of the chlorination when the last two chlorine atoms are being introduced into the molecule.

*Example III*

3.7 g. SbCl₃ was added to 200 g. of molten phthalic anhydride in the reactor used in Example I. Chlorine gas was introduced at the relatively slow rate of 10–20 g. per hour and the temperature was gradually increased from 200 to 265° C. Initial chlorine conversions of 50–70 percent were obtained for a few hours but the conversion dropped to zero when about one third of the necessary chlorine had been added. Additional amounts of catalyst were added at frequent intervals in an effort to complete the reaction and at each addition the conversion increased somewhat but rapidly dropped again. The highest conversion reached after the first such addition was 39%, after the second was 22% and later conversions were even lower. A total of 39.7 g. SbCl₃ was added and the product contained 2.35 g. Sb equivalent to 4.41 g. Sb Cl₃ so there was no lack of catalyst. The chlorination required 264 hours or 11 days for completion. It is evident that antimony chlorides are not practical chlorination catalysts in this reaction.

The catalyst of our invention may be supplied to the reaction in various forms. Molybdenum metal powder is particularly convenient and economical. Molybdenum chlorides such as MoCl₅, MoCl₄, MoCl₃ or (MoCl₂)₃ may be employed. Any other molybdenum compounds may be employed which chlorinate to molybdenum chloride under the reaction conditions and we do not wish to be limited to a Mo catalyst from any particular source.

Where "a phthalic anhydride" or "phthalic anhydrides" are mentioned as starting materials, it will be understood that phthalic anhydride or any chlorophthalic anhydride, with a chlorine content lower than the desired product, may be used.

Our invention may be applied in many different ways. One or more chlorinators may be used at widely varied temperatures at which the catalyst is active. The crude product may be purified by distillation, by crystallization from organic solvents, by solution as a soluble salt and crystallization from aqueous solution, or by any other known method of the prior art.

While we have shown a batch process, it will be evident that our process and catalyst are readily adaptable to a cascade or continuous operation. In the broad form of our invention, we do not wish to be limited to any particular method of operation except as limited by the claims.

We claim as our invention:

1. The process of chlorinating phthalic anhydrides which comprises reacting elemental chlorine with a phthalic anhydride in the presence of a chloride of molybdenum as a catalyst.

2. The process of chlorinating phthalic anhydrides which comprises contacting elemental chlorine with a liquid phthalic anhydride in the presence of molybdenum pentachloride as chlorinating temperatures within the range at about 55° C. to 275° C.

3. The process of chlorinating phthalic anhydrides which comprises contacting elemental chlorine with a molten phthalic anhydride in the presence of a chloride of molybdenum as a catalyst at a temperature above 150° C.

4. The method of making tetrachlorophthalic anhydride which comprises contacting elemental chlorine with liquid phthalic anhydride in the presence of a chloride of molybdenum as a catalyst at chlorinating temperatures within the range of 150° C. to 275° C.

5. The process of chlorinating phthalic anhydrides which comprises reacting elemental chlorine with a phthalic anhydride in the presence of a chloride of molybdenum as a catalyst and volatilizing the molybdenum chloride catalyst from chlorophthalic anhydride at the conclusion of the reaction.

6. A process of producing tetrachlorophthalic anhydride which includes reacting elemental chlorine with a phthalic anhydride in the presence of a molybdenum chloride as a catalyst and upon substantial completion of the chlorination reaction, passing a gas inert to the reaction mass through said mass to volatilize and remove molybdenum chloride therefrom.

7. A process of producing a tetrachlorophthalic anhydride which includes reacting elemental chlorine with a phthalic anhydride in the presence of a molybdenum chloride as a catalyst and upon substantial completion of the chlorination reaction passing excess chlorine through the mass to volatilize and remove molybdenum chloride therefrom.

PAUL W. BLUME.
GERALD A. THOMAS.
GERVAIS BAILLIO.

REFERENCES CITED

The following references are of record in the file of this patent:

UNITED STATES PATENTS

| Number | Name | Date |
|---|---|---|
| 2,028,383 | Dvornikoff | Jan. 21, 1936 |
| 2,189,726 | Conover | Feb. 6, 1940 |
| 2,333,368 | Gaskill | Nov. 2, 1943 |
| 1,891,843 | Shaw | Dec. 20, 1932 |
| 1,564,044 | Brown | Dec. 1, 1925 |
| 322,368 | Gnehm | July 14, 1885 |

FOREIGN PATENTS

| Number | Country | Date |
|---|---|---|
| 32,564 | Germany | July 30, 1885 |

OTHER REFERENCES

Ellis, "Chemistry of Petroleum Derivatives," (1934), pages 756, 758, 759, 770.

Berkman, Morrell, Egloff, "Catalysis," (1940), Reinhold Pub. Corp., page 590.

Certificate of Correction

Patent No. 2,429,985.   November 4, 1947.

PAUL W. BLUME ET AL.

It is hereby certified that the above numbered patent was erroneously issued to Paul W. Blume, Gerald A. Thomas, and Gervais Baillio, whereas said patent should have been issued to *Paul W. Blume and Gerald A. Thomas*; column 4, line 26, after the word "reaction" insert *mass*; column 7, line 27, claim 2, after "pentachloride" strike out "as" and insert instead *at*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.* will be understood that phthalic anhydride or any chlorophthalic anhydride, with a chlorine content lower than the desired product, may be used.

Our invention may be applied in many different ways. One or more chlorinators may be used at widely varied temperatures at which the catalyst is active. The crude product may be purified by distillation, by crystallization from organic solvents, by solution as a soluble salt and crystallization from aqueous solution, or by any other known method of the prior art.

While we have shown a batch process, it will be evident that our process and catalyst are readily adaptable to a cascade or continuous operation. In the broad form of our invention, we do not wish to be limited to any particular method of operation except as limited by the claims.

We claim as our invention:

1. The process of chlorinating phthalic anhydrides which comprises reacting elemental chlorine with a phthalic anhydride in the presence of a chloride of molybdenum as a catalyst.

2. The process of chlorinating phthalic anhydrides which comprises contacting elemental chlorine with a liquid phthalic anhydride in the presence of molybdenum pentachloride as chlorinating temperatures within the range at about 55° C. to 275° C.

3. The process of chlorinating phthalic anhydrides which comprises contacting elemental chlorine with a molten phthalic anhydride in the presence of a chloride of molybdenum as a catalyst at a temperature above 150° C.

4. The method of making tetrachlorophthalic anhydride which comprises contacting elemental chlorine with liquid phthalic anhydride in the presence of a chloride of molybdenum as a catalyst at chlorinating temperatures within the range of 150° C. to 275° C.

5. The process of chlorinating phthalic anhydrides which comprises reacting elemental chlorine with a phthalic anhydride in the presence of a chloride of molybdenum as a catalyst and volatilizing the molybdenum chloride catalyst from chlorophthalic anhydride at the conclusion of the reaction.

6. A process of producing tetrachlorophthalic anhydride which includes reacting elemental chlorine with a phthalic anhydride in the presence of a molybdenum chloride as a catalyst and upon substantial completion of the chlorination reaction, passing a gas inert to the reaction mass through said mass to volatilize and remove molybdenum chloride therefrom.

7. A process of producing a tetrachlorophthalic anhydride which includes reacting elemental chlorine with a phthalic anhydride in the presence of a molybdenum chloride as a catalyst and upon substantial completion of the chlorination reaction passing excess chlorine through the mass to volatilize and remove molybdenum chloride therefrom.

PAUL W. BLUME.
GERALD A. THOMAS.
GERVAIS BAILLIO.

REFERENCES CITED

The following references are of record in the file of this patent:

UNITED STATES PATENTS

| Number | Name | Date |
|---|---|---|
| 2,028,383 | Dvornikoff | Jan. 21, 1936 |
| 2,189,726 | Conover | Feb. 6, 1940 |
| 2,333,368 | Gaskill | Nov. 2, 1943 |
| 1,891,843 | Shaw | Dec. 20, 1932 |
| 1,564,044 | Brown | Dec. 1, 1925 |
| 322,368 | Gnehm | July 14, 1885 |

FOREIGN PATENTS

| Number | Country | Date |
|---|---|---|
| 32,564 | Germany | July 30, 1885 |

OTHER REFERENCES

Ellis, "Chemistry of Petroleum Derivatives," (1934), pages 756, 758, 759, 770.

Berkman, Morrell, Egloff, "Catalysis," (1940), Reinhold Pub. Corp., page 590.

---

Certificate of Correction

Patent No. 2,429,985.

November 4, 1947.

PAUL W. BLUME ET AL.

It is hereby certified that the above numbered patent was erroneously issued to Paul W. Blume, Gerald A. Thomas, and Gervais Baillio, whereas said patent should have been issued to *Paul W. Blume and Gerald A. Thomas*; column 4, line 26, after the word "reaction" insert *mass*; column 7, line 27, claim 2, after "pentachloride" strike out "as" and insert instead *at*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*